United States Patent
Watkins

(10) Patent No.: US 10,640,126 B2
(45) Date of Patent: May 5, 2020

(54) TAILGATING DETECTION AND MONITORING ASSEMBLY

(71) Applicant: Edmund Watkins, Columbus, NC (US)

(72) Inventor: Edmund Watkins, Columbus, NC (US)

( * ) Notice: Subject to any disclaimer, the term of this patent is extended or adjusted under 35 U.S.C. 154(b) by 24 days.

(21) Appl. No.: 15/865,389

(22) Filed: Jan. 9, 2018

(65) Prior Publication Data
US 2019/0210616 A1    Jul. 11, 2019

(51) Int. Cl.
| | | |
|---|---|---|
| F16M 1/02 | (2006.01) |
| F16M 11/04 | (2006.01) |
| F16M 11/14 | (2006.01) |
| F16C 11/06 | (2006.01) |
| B23Q 1/25 | (2006.01) |
| B23Q 1/54 | (2006.01) |
| B25B 11/00 | (2006.01) |
| B25J 15/06 | (2006.01) |
| B25J 17/02 | (2006.01) |
| B25J 19/00 | (2006.01) |
| B60Q 1/50 | (2006.01) |
| B60Q 1/52 | (2006.01) |
| B60Q 1/00 | (2006.01) |
| B60Q 1/26 | (2006.01) |
| B60Q 1/44 | (2006.01) |
| G05D 1/02 | (2020.01) |
| G06F 17/10 | (2006.01) |
| G06F 1/10 | (2006.01) |
| G06F 1/16 | (2006.01) |
| B60R 11/04 | (2006.01) |
| F16B 1/00 | (2006.01) |
| F16M 13/02 | (2006.01) |
| H04N 7/18 | (2006.01) |

(Continued)

(52) U.S. Cl.
CPC ......... *B60W 50/14* (2013.01); *G06K 9/00805* (2013.01)

(58) Field of Classification Search
None
See application file for complete search history.

(56) References Cited

U.S. PATENT DOCUMENTS 5,260,731 A * 11/1993 Baker, Jr. ............... B60R 11/04
                                                               224/556
6,225,918 B1    5/2001 Kam
(Continued)

FOREIGN PATENT DOCUMENTS

CN         206569009 U  * 10/2017

*Primary Examiner* — Adam D Tissot
*Assistant Examiner* — Laura E Linhardt

(57) ABSTRACT

A tailgating detection and monitoring assembly includes a speed detector, a sensor, a visual warning module, and an imager, which are configured to couple to a rear window of a first vehicle and are operationally coupled to a control module. The speed detector is configured to measure a speed of the first vehicle. The sensor is configured to measure a distance between the first vehicle and a second vehicle that is behind the first vehicle. The control module is positioned to determine a separation between the first vehicle and the second vehicle and a speed of the second vehicle based on signals from the speed detector and the sensor to determine a tailgating event. The control module is positioned to command the visual warning module to display a notification to a driver of the second vehicle and to command the imager to capture an image of the tailgating event.

15 Claims, 6 Drawing Sheets

(51) Int. Cl.
*B60W 50/14* (2020.01)
*G06K 9/00* (2006.01)

(56) References Cited

U.S. PATENT DOCUMENTS

| | | |
|---|---|---|
| 7,057,501 B1 | 6/2006 | Davis |
| 7,123,168 B2 | 10/2006 | Schofield |
| 8,536,994 B2* | 9/2013 | Hada ................ B60Q 1/525 340/435 |
| 2002/0003352 A1* | 1/2002 | Portal ................ B23Q 1/5462 279/3 |
| 2005/0134441 A1* | 6/2005 | Somuah ............. B60Q 1/503 340/435 |
| 2007/0159311 A1* | 7/2007 | Schober ............. B60Q 1/525 340/435 |
| 2009/0147996 A1 | 6/2009 | Peng |
| 2010/0156620 A1 | 6/2010 | Shams et al. |
| 2011/0080481 A1* | 4/2011 | Bellingham .......... B60R 1/12 348/148 |
| 2016/0259374 A1* | 9/2016 | Breiwa ............... H02J 50/10 |
| 2017/0246988 A1* | 8/2017 | Ihedinmah ........... B60Q 1/503 |
| 2017/0369055 A1* | 12/2017 | Saigusa ............. G08G 1/096791 |

* cited by examiner

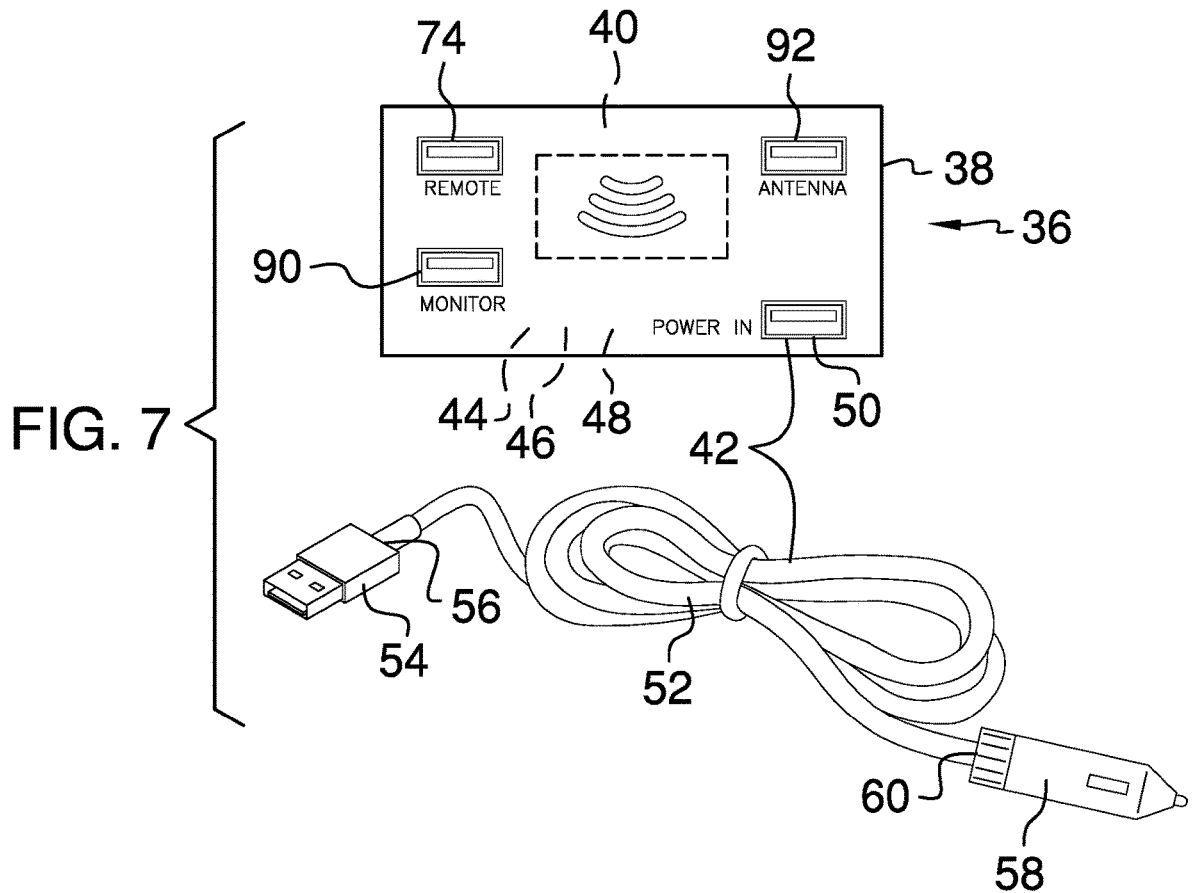
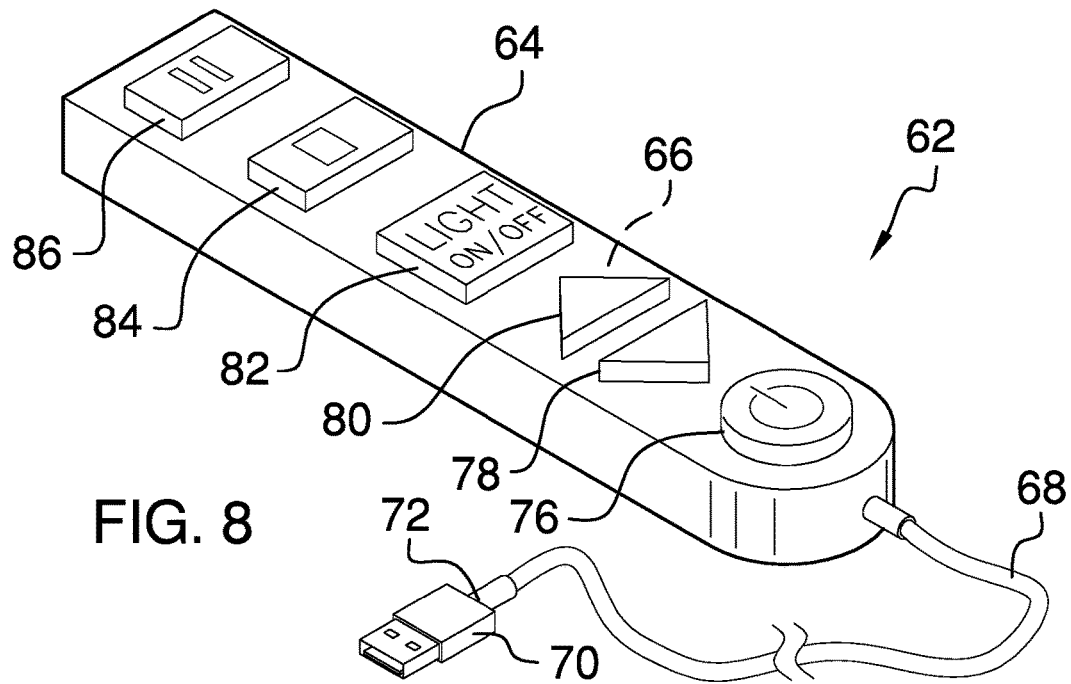

TAILGATING DETECTION AND MONITORING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to detection and monitoring assemblies and more particularly pertains to a new detection and monitoring assembly for a vehicle.

BRIEF SUMMARY OF THE INVENTION

An embodiment of the disclosure meets the needs presented above by generally comprising a speed detector, a sensor, a visual warning module, and an imager, which are configured to couple to a rear window of a first vehicle and are operationally coupled to a control module. The speed detector is configured to measure a speed of the first vehicle. The sensor is configured to measure a distance between the first vehicle and a second vehicle that is behind the first vehicle. The control module is positioned to determine a separation between the first vehicle and the second vehicle and a speed of the second vehicle based on signals from the speed detector and the sensor to determine a tailgating event. The control module is positioned to command the visual warning module to display a notification to a driver of the second vehicle and to command the imager to capture an image of the tailgating event.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 7 is a front view of an embodiment of the disclosure.

FIG. 8 is an isometric perspective view of an embodiment of the disclosure.

DETAILED DESCRIPTION OF THE INVENTION

Figure 1:
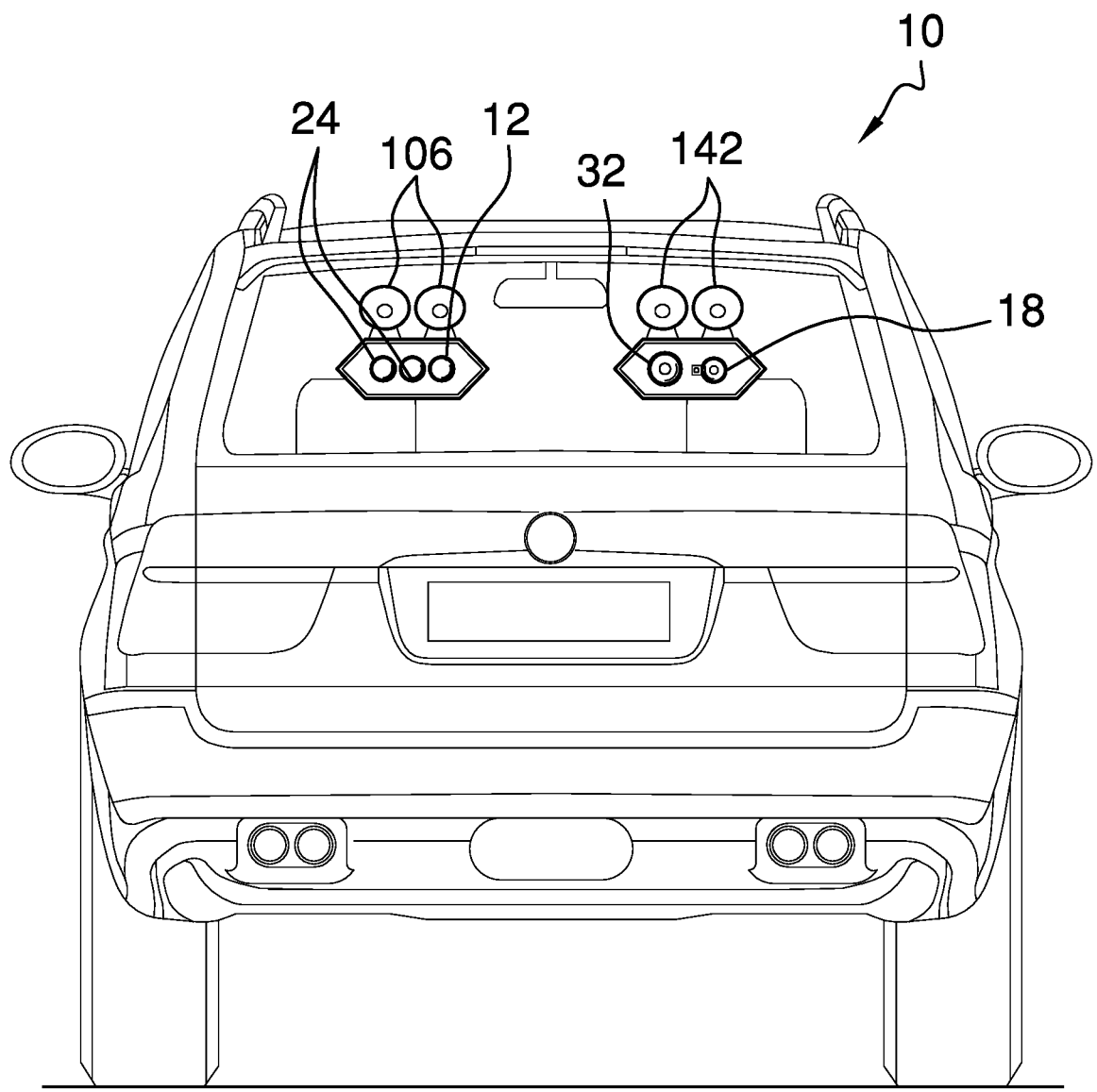
FIG. 1 is an in-use view of a tailgating detection and monitoring assembly according to an embodiment of the disclosure.

With reference now to the drawings, and in particular to FIGS. 1 through 9 thereof, a new detection and monitoring assembly embodying the principles and concepts of an embodiment of the disclosure and generally designated by the reference numeral 10 will be described.

Figure 2:
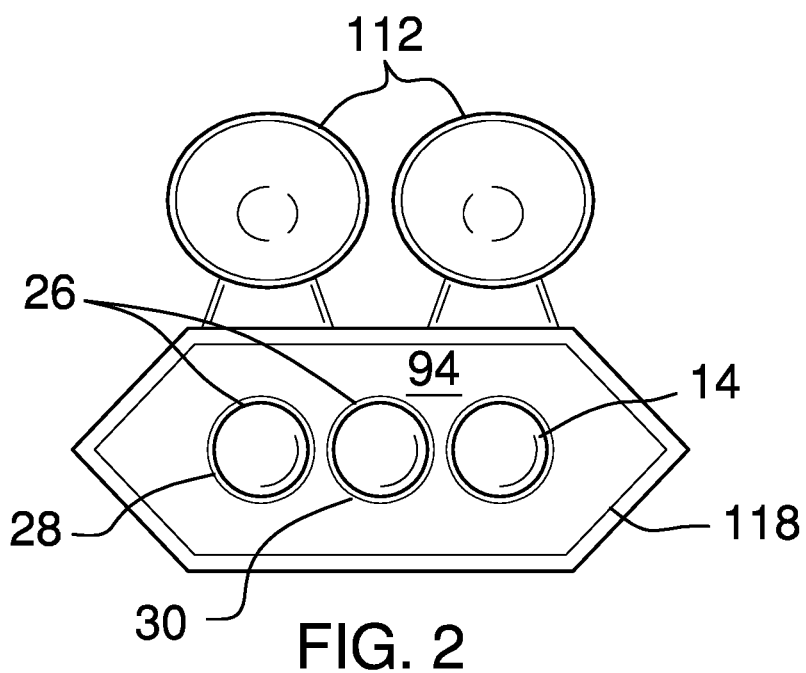
FIG. 2 is a detail view of an embodiment of the disclosure.
Figure 6:
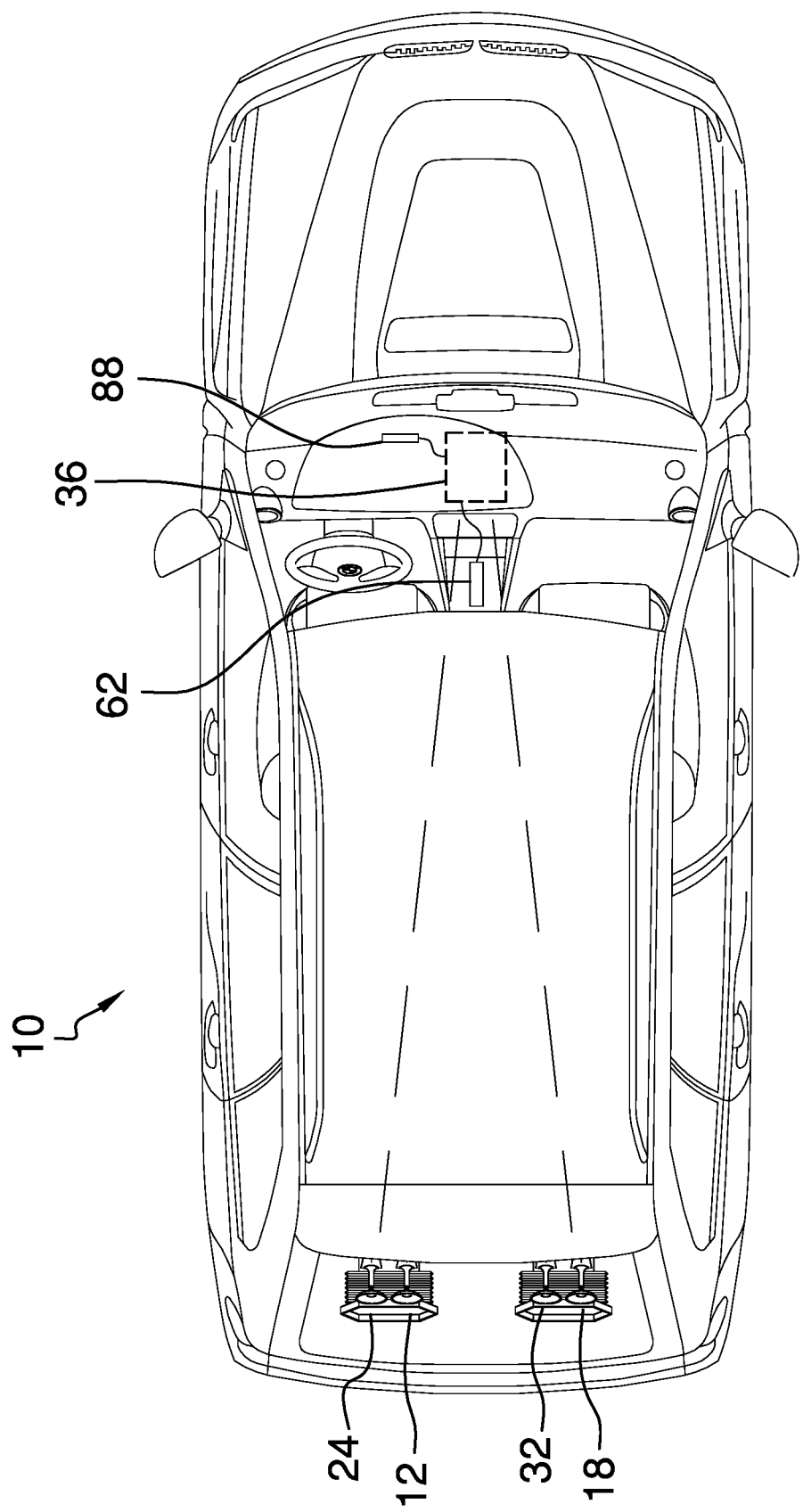
FIG. 6 is an in-use view of an embodiment of the disclosure.
Figure 9:
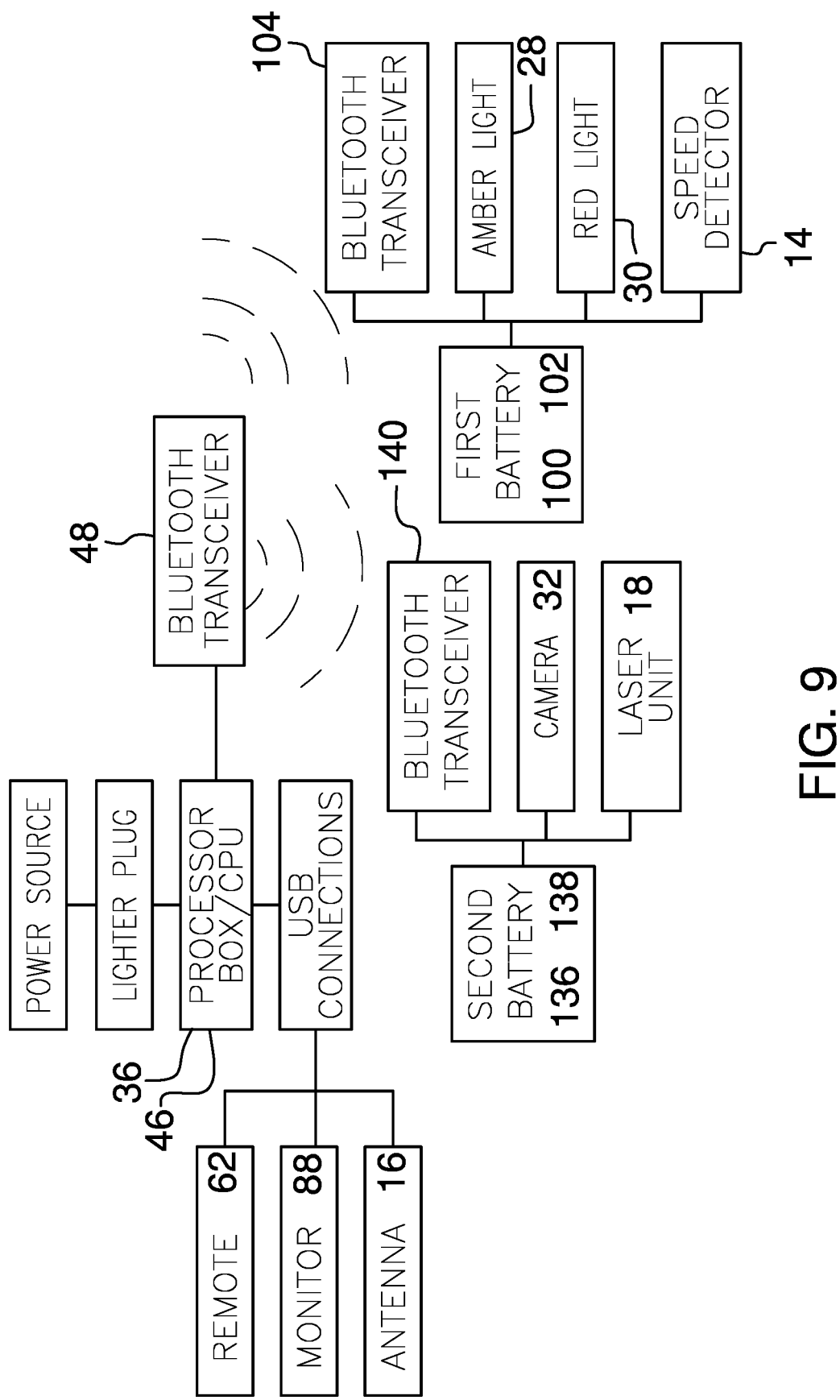
FIG. 9 is a block diagram of an embodiment of the disclosure.

As best illustrated in FIGS. 1 through 9, the tailgating detection and monitoring assembly 10 generally comprises a speed detector 12 that is configured to couple to a rear window of a first vehicle. The speed detector 12 is configured to selectively measure a speed of the first vehicle. The speed detector 12 comprises a doppler radar unit 14, as shown in FIG. 2, or a global positioning system receiver 16, as shown in FIG. 6, or the like. With the doppler radar unit 14, the speed of the first vehicle is determined relative to a stationary background.

Figure 3:
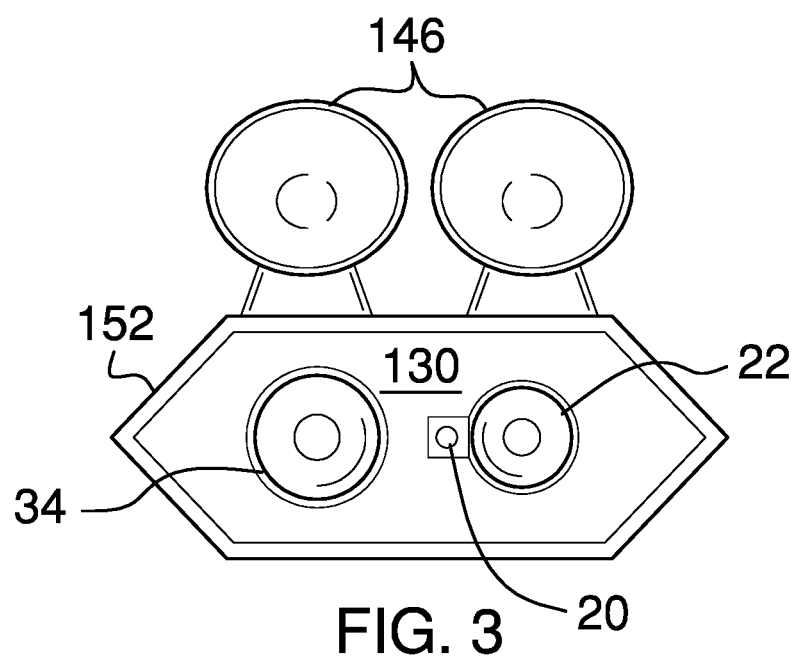
FIG. 3 is a detail view of an embodiment of the disclosure.
Figure 4:
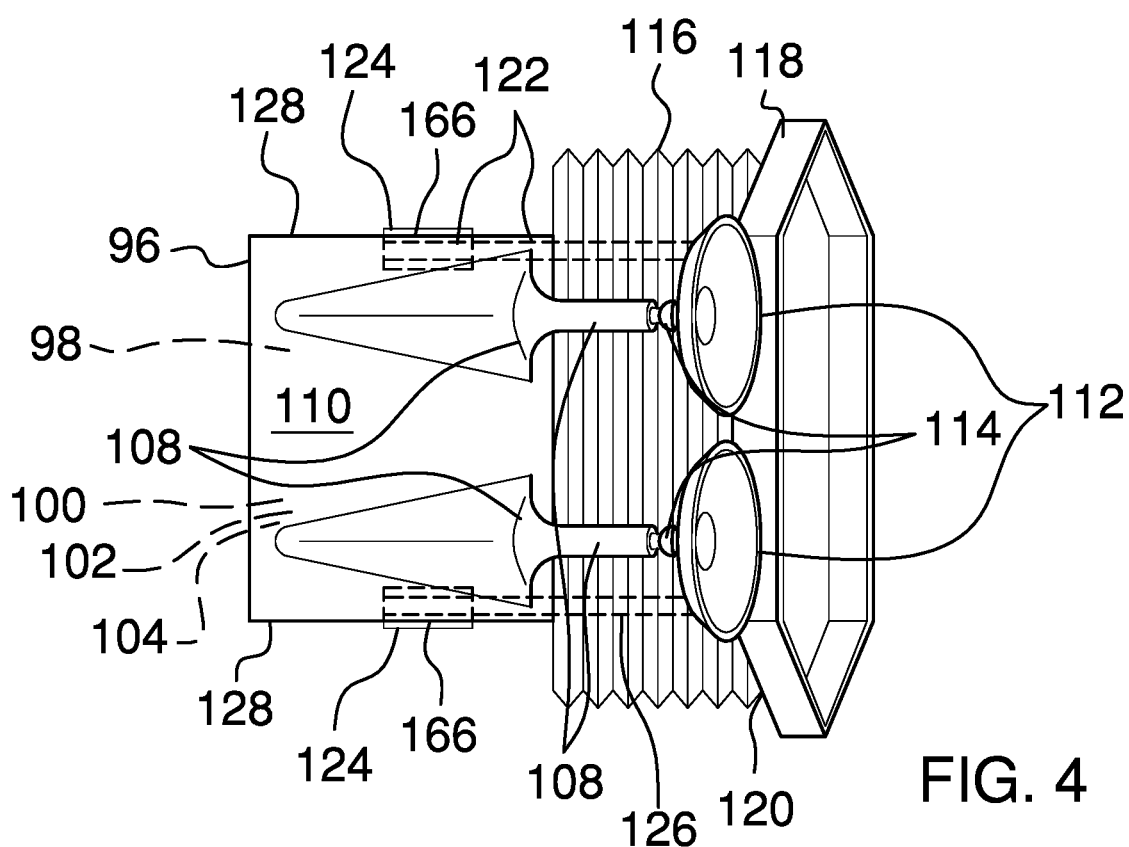
FIG. 4 is a top view of an embodiment of the disclosure.
Figure 5:
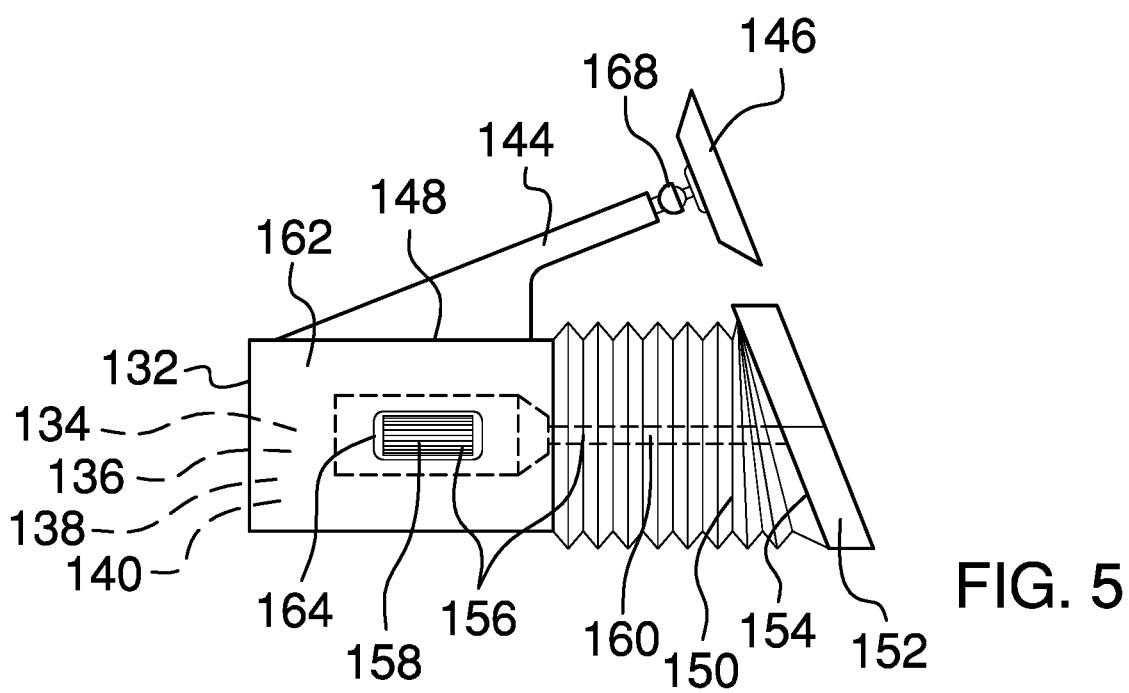
FIG. 5 is a side view of an embodiment of the disclosure.

A sensor 18 is configured to couple to the rear window. The sensor 18 is configured to selectively measure a distance between the first vehicle and a second vehicle that is behind the first vehicle. The sensor 18 comprises a laser emitter 20 and a laser receiver 22, as shown in FIG. 3, or a like combination.

A visual warning module 24 is configured to couple to the rear window. The visual warning module 24 is configured to selectively display a notification to a driver of the second vehicle. The visual warning module 24 comprises a plurality of lights 26. Each light 26 emits a respective color so that the plurality of lights 26 is positioned to selectively emit one of a plurality of colors. The plurality of lights 26 comprises an amber emitter 28 and a red emitter 30, as shown in FIG. 2.

An imager 32 is configured to couple to the rear window. The imager 32 is configured to selectively capture an image of the second vehicle. The imager 32 comprises a video camera 34, as shown in FIG. 3, or the like.

A control module 36, shown in FIG. 7, is operationally coupled to the speed detector 12, the visual warning module 24, the imager 32, and the sensor 18. The control module 36 is configured to selectively actuate the speed detector 12, the visual warning module 24, the imager 32, and the sensor 18. The control module 36 is positioned to determine a separation between the first vehicle and the second vehicle, as well as a speed of the second vehicle, based on signals from the speed detector 12 and the sensor 18, to determine a tailgating event.

The control module 36 is positioned to selectively command the visual warning module 24 to display the notification to the driver of the second vehicle. For example, the control module 36 can command illumination of the amber emitter 28 to warn the driver of the second vehicle of a pending tailgating event so that the driver can take corrective action. The control module 36 also can command illumination of the red emitter 30 to warn the driver of the second vehicle of an ongoing tailgating event so that the driver can take corrective action. The control module 36 is positioned to selectively command the imager 32 to capture the image of the tailgating event.

The control module 36 is wirelessly coupled to the speed detector 12, the visual warning module 24, the imager 32, and the sensor 18. Suitable wireless protocols include a wireless protocol utilizing ultra high frequency radio waves from 2.4 GHz to 2.485 GHz.

The control module 36 comprises a first housing 38 that defines a first interior space 40. A first power module 42, a microprocessor 44, a data storage module 46, and a first transceiver 48 are coupled to the first housing 38 and are positioned in the first interior space 40. The first power module 42 comprises a first port 50 and a cable 52. The first port 50 is coupled to the first housing 38 and is operationally coupled to the microprocessor 44. The cable 52 has a first plug 54 that is coupled to a first end 56. The first plug 54 is complementary to the first port 50. The cable 52 has a second plug 58 that is coupled to a second end 60. The second plug 58 is complementary to a cigarette lighter receptacle of the first vehicle. The first plug 54 is positioned to be inserted into the first port 50 and the second plug 58 is configured to be inserted into the cigarette lighter receptacle to power the control module 36.

The microprocessor 44 is operationally coupled to the first power module 42. The data storage module 46 and the first transceiver 48 are operationally coupled to the microprocessor 44. The data storage module 46 is positioned to store the image of the tailgating event captured by the imager 32. The first transceiver 48 is configured to transmit the image of the tailgating event to an external device, such as a computer of a user.

A remote controller 62, shown in FIG. 8, is operationally coupled to the control module 36. The remote controller 62 is positioned to selectively input commands into the microprocessor 44 to control the speed detector 12, the visual warning module 24, the imager 32, and the sensor 18.

The remote controller 62 comprises a second housing 64 that defines a second interior space 66. A cord 68 is coupled to and extends from the second housing 64. A third plug 70 is coupled to a terminus 72 of the cord 68 distal from the second housing 64. The third plug 70 is complementary to a second port 74, which is coupled to the first housing 38 and operationally coupled to the microprocessor 44. The third plug 70 is positioned to be inserted into the second port 74 to operationally couple the remote controller 62 to the control module 36. The present invention also anticipates the remote controller 62 being wirelessly connected to the control module 36.

A first button 76, a second button 78, a third button 80, a fourth button 82, a fifth button 84, and a sixth button 86 are coupled to the second housing 64. The first button 76, the second button 78, the third button 80, the fourth button 82, the fifth button 84, and the sixth button 86 are selectively depressible and are operationally coupled to the cord 68. The first button 76 is configured to be depressed to selectively couple the microprocessor 44 to the first power module 42.

The second button 78 and the third button 80 are configured to be depressed to selectively input commands into the microprocessor 44 to adjust algorithms used to selectively control the speed detector 12, the visual warning module 24, the imager 32, and the sensor 18. Algorithms stored in the microprocessor 44 dictate the parameters to define the tailgating event and can be adjusted using the second button 78 and the third button 80.

The fourth button 82 is configured to be depressed to selectively instruct the microprocessor 44 to command the visual warning module 24 to display the notification to the driver of the second vehicle. The fifth button 84 is configured to be depressed to selectively instruct the microprocessor 44 to command the imager 32 to terminate capturing of the image of the tailgating event. The sixth button 86 is configured to be depressed to selectively instruct the microprocessor 44 to command the imager 32 to commence capturing of the image of the tailgating event.

A monitor 88 is operationally coupled to the control module 36. The monitor 88 is configured to selectively present to an operator of the first vehicle the speed of the first vehicle, the speed of the second vehicle, the separation between the first vehicle and the second vehicle, and the image of the tailgating event.

A third port 90 is coupled to the first housing 38. The third port 90 is operationally coupled to the microprocessor 44. The third port 90 is selectively couplable to the monitor 88 to operationally couple the monitor 88 to the control module 36. The third port 90 also is selectively couplable to the external device to transmit the image of the tailgating event from the data storage module 46 to the external device.

A fourth port 92 is coupled to the first housing 38. The fourth port 92 is operationally coupled to the microprocessor 44. The global positioning system receiver 16 is coupled to the fourth port 92. The speed of the first vehicle is determined by positional change of the first vehicle.

The speed detector 12 and the visual warning module 24 are coupled to a first side 94 of a third housing 96. The third housing 96 defines a third interior space 98. A second power module 100 is coupled to the third housing 96 and is positioned in the third interior space 98. The second power module 100 comprises a first battery 102.

A second transceiver 104 is coupled to the third housing 96 and is positioned in the third interior space 98. The second transceiver 104 is operationally coupled to the second power module 100, the speed detector 12 and the visual warning module 24. The second transceiver 104 is positioned to receive commands from the microprocessor 44 via the first transceiver 48 to selectively control the second power module 100, the speed detector 12, and the visual warning module 24. The second transceiver 104 is positioned to transmit the signal from the speed detector 12 to the microprocessor 44 via the first transceiver 48.

A first coupler 106 is coupled to the third housing 96. The first coupler 106 is configured to couple the third housing 96 to an inner surface of a rear window of the first vehicle. The first coupler 106 comprises a pair of first arms 108. Each first arm 108 is coupled to and extends transversely from a top 110 of the third housing 96 proximate to the first side 94.

Each of a pair of first cups 112 is coupled to a respective first arm 108 distal from the third housing 96. The first cups 112 are resilient. The first cups 112 are configured to be depressed against the rear window to suctionally couple the third housing 96 to the rear window. Each of a pair of first ball joints 114 is coupled to and extends between a respective first arm 108 and an associated first cup 112. The first ball joints 114 allow the first cups 112 to adjust to the angle of the rear window of the first vehicle.

A first tube 116 is coupled to and extends from the first side 94 of the third housing 96. The first tube 116 comprises pleated foam rubber so that the first tube 116 is selectively extensible. A first gasket 118 is coupled to a perimeter 120 of the first tube 116 distal from the third housing 96.

A first actuator 122 is coupled to the third housing 96 and is positioned in the third internal space. The first actuator 122 is operationally coupled to the first gasket 118. The first actuator 122 is positioned to selectively extend the first tube 116. The first gasket 118 is sealably coupled to the rear window to block light from impinging on the speed detector 12 and the visual warning module 24.

The first actuator 122 comprises a pair of first cylinders 124 and a pair of first rods 126. Each first cylinder 124 is rotationally coupled to a respective opposing side face 128 of the third housing 96. The first cylinder 124 protrudes through a first orifice 166 that is positioned in the respective opposing side face 128. Each first rod 126 is operationally coupled to an associated first cylinder 124. The first rod 126 is selectively extensible from the first side 94 of the third housing 96. Each first rod 126 is coupled to the first gasket 118. Each first cylinder 124 is positioned to be rotated by a digit of a hand of the user to selectively extend an associated first rod 126. The first gasket 118 is sealably coupled to the rear window to block the light from impinging on the speed detector 12 and the visual warning module 24.

The sensor 18 and the imager 32 are coupled to a first face 130 of a fourth housing 132. The fourth housing 132 defines a fourth interior space 134. A third power module 136 is coupled to the fourth housing 132 and is positioned in the fourth interior space 134. The third power module 136 comprises a second battery 138.

A third transceiver 140 is coupled to the fourth housing 132 and is positioned in the fourth interior space 134. The third transceiver 140 is operationally coupled to the third power module 136, the sensor 18, and the imager 32. The third transceiver 140 is positioned to receive commands from the microprocessor 44 via the first transceiver 48 to selectively control the third power module 136, the sensor 18, and the imager 32. The third transceiver 140 is positioned to transmit the signal from the sensor 18 and the image from the imager 32 to the microprocessor 44 via the first transceiver 48.

A second coupler 142 is coupled to the fourth housing 132. The second coupler 142 is configured to couple the fourth housing 132 to the inner surface of the rear window of the first vehicle.

The second coupler 142 comprises a pair of second arms 144 and a pair of second cups 146. Each second arm 144 is coupled to and extends transversely from an upper face 148 of the fourth housing 132 proximate to the first face 130. Each second cup 146 is coupled to a respective second arm 144 distal from the fourth housing 132. The second cups 146 are resilient. The second cups 146 are configured to be depressed against the rear window to suctionally couple the fourth housing 132 to the rear window. Each of a pair of second ball joints 168 is coupled to and extends between a respective second arm 144 and an associated second cup 146. The second ball joints 168 allow the second cups 146 to adjust to the angle of the rear window of the first vehicle.

A second tube 150 is coupled to and extends from the first face 130 of the fourth housing 132. The second tube 150 comprises pleated foam rubber so that the second tube 150 is selectively extensible. A second gasket 152 is coupled to a circumference 154 of the second tube 150 distal from the fourth housing 132.

A second actuator 156 is coupled to the fourth housing 132 and is positioned in the fourth interior space 134. The second actuator 156 is operationally coupled to the second gasket 152. The second actuator 156 is positioned to selectively extend the second tube 150. The second gasket 152 is sealably coupled to the rear window to block light from impinging on the sensor 18 and the imager 32.

The second actuator 156 comprises a pair of second cylinders 158 and a pair of second rods 160. Each second cylinder 158 is rotationally coupled to a respective opposing side 162 of the fourth housing 132. The second cylinder 158 protrudes through a second orifice 164 that is positioned in the respective opposing side 162. Each second rod 160 is operationally coupled to an associated second cylinder 158. The second rod 160 is selectively extensible from the first face 130 of the fourth housing 132. Each second rod 160 is coupled to the second gasket 152. Each second cylinder 158 is positioned to be rotated by the digit of the hand of the user to selectively extend an associated second rod 160. The second gasket 152 is sealably coupled to the rear window to block the light from impinging on the sensor 18 and the imager 32.

In use, the first cups 112 are configured to be depressed against the rear window to suctionally couple the third housing 96 to the rear window. The second cups 146 are configured to be depressed against the rear window to suctionally couple the fourth housing 132 to the rear window. The control module 36 is positioned to determine the separation between the first vehicle and the second vehicle, as well as the speed of the second vehicle, based on signals from the speed detector 12 and the sensor 18, to determine the tailgating event. The control module 36 is positioned to selectively command the visual warning module 24 to display the notification to the driver of the second vehicle. The control module 36 is positioned to selectively command the imager 32 to capture the image of the tailgating event.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A tailgating detection and monitoring assembly comprising:
   a speed detector configured for coupling to a rear window of a first vehicle, said speed detector being configured for selectively measuring a speed of the first vehicle;
   a sensor configured for coupling to the rear window, said sensor being configured for selectively measuring a distance between the first vehicle and a second vehicle behind the first vehicle;
   a visual warning module configured for coupling to the rear window, said visual warning module being configured for selectively displaying a notification to a driver of the second vehicle;
   an imager configured for coupling to the rear window, said imager being configured for selectively capturing an image of the second vehicle;
   a control module operationally coupled to said speed detector, said visual warning module, said imager, and said sensor, said control module being configured for selectively actuating said speed detector, said visual warning module, said imager, and said sensor, said control module comprising
      a first housing defining a first interior space,
      a second port coupled to said first housing,
      a first power module coupled to said first housing and positioned in said first interior space,
      a microprocessor coupled to said first housing and positioned in said first interior space, said microprocessor being operationally coupled to said first power module, said second port being operationally coupled to said microprocessor,
      a data storage module coupled to said first housing and positioned in said first interior space, said data storage module being operationally coupled to said microprocessor, wherein said data storage module is positioned in said first housing such that said data storage module is positioned for storing the image of the tailgating event captured by said imager,
      a first transceiver coupled to said first housing and positioned in said first interior space, said first transceiver being operationally coupled to said microprocessor, and
      wherein said first transceiver is positioned in said first housing such that said first transceiver is configured for transmitting the image of the tailgating event to an external device;
   a remote controller operationally coupled to said control module such that said remote controller is positioned for selectively inputting commands into said microprocessor for controlling said speed detector, said visual warning module, said imager, and said sensor, said remote controller comprising
      a second housing defining a second interior space,
      a cord coupled to and extending from said second housing,
      a third plug coupled to a terminus of said cord distal from said second housing, said third plug being complementary to said second port, and
      a first button, a second button, a third button, a fourth button, a fifth button, and a sixth button coupled to said second housing, said first button, said second button, said third button, said fourth button, said fifth button, and said sixth button being selectively depressible and operationally coupled to said cord;
   wherein said third plug is positioned on said cord such that said third plug is positioned for inserting into said second port for operationally coupling said remote controller to said control module, wherein said first button is configured for depressing for selectively coupling said microprocessor to said first power module, wherein said second button and said third button are configured for depressing for selectively inputting commands into said microprocessor for adjusting algorithms used for selectively controlling said speed detector, said visual warning module, said imager, and said sensor, wherein said fourth button is configured for depressing for selectively instructing said microprocessor for commanding said visual warning module for displaying the notification to the driver of the second vehicle, wherein said fifth button is configured for depressing for selectively instructing said microprocessor for commanding said imager for terminating capturing of the image of the tailgating event, wherein said sixth button is configured for depressing for selectively instructing said microprocessor for commanding said imager for commencing capturing of the image of the tailgating event; and
   wherein said control module is positioned for determining a separation between the first vehicle and the second vehicle and a speed of the second vehicle based on signals from said speed detector and said sensor for determining a tailgating event, wherein said control module is positioned for selectively commanding said visual warning module for displaying the notification to the driver of the second vehicle, and wherein said control module is positioned for selectively commanding said imager for capturing the image of the tailgating event.

2. The assembly of claim 1, further comprising:
   said speed detector comprising a doppler radar unit such that the speed of the first vehicle is determined relative to a stationary background;
   said sensor comprising a laser emitter and a laser receiver;
   said visual warning module comprising a plurality of lights, each said light emitting a respective color such that said plurality of lights is positioned for selectively emitting one of a plurality of colors; and
   said imager comprising a video camera.

3. The assembly of claim 2, further including said plurality of lights comprising an amber emitter and a red emitter.

4. The assembly of claim 2, further including said control module being wirelessly coupled to said speed detector, said visual warning module, said imager, and said sensor.

5. The assembly of claim 1, further including said first power module comprising a first port and a cable, said first port being coupled to said first housing, said first port being operationally coupled to said microprocessor, said cable having a first plug coupled to a first end, said first plug being complementary to said first port, said cable having a second plug coupled to a second end, said second plug being complementary to a cigarette lighter receptacle of the first vehicle, wherein said first plug and said second plug are positioned on said cable such that said first plug is positioned for inserting into said first port and said second plug is configured for inserting into the cigarette lighter receptacle for powering said control module.

6. The assembly of claim 1, further including a monitor operationally coupled to said control module, said monitor being configured for selectively presenting to an operator of the first vehicle the speed of the first vehicle, the speed of the second vehicle, the separation between the first vehicle and the second vehicle, and the image of the tailgating event.

7. The assembly of claim 6, further including a third port coupled to said first housing, said third port being operationally coupled to said microprocessor, said third port being selectively couplable to said monitor for operationally coupling said monitor to said control module, said third port being selectively couplable to the external device for transmitting the image of the tailgating event to the external device from said data storage module.

8. The assembly of claim 1, further comprising:
a fourth port coupled to said first housing, said fourth port being operationally coupled to said microprocessor; and
said speed detector comprising a global positioning system receiver, said global positioning system receiver being coupled to said fourth port such that the speed of the first vehicle is determined by positional change of the first vehicle.

9. A tailgating detection and monitoring assembly comprising:
a speed detector configured for coupling to a rear window of a first vehicle, said speed detector being configured for selectively measuring a speed of the first vehicle;
a sensor configured for coupling to the rear window, said sensor being configured for selectively measuring a distance between the first vehicle and a second vehicle behind the first vehicle;
a visual warning module configured for coupling to the rear window, said visual warning module being configured for selectively displaying a notification to a driver of the second vehicle;
an imager configured for coupling to the rear window, said imager being configured for selectively capturing an image of the second vehicle;
a control module operationally coupled to said speed detector, said visual warning module, said imager, and said sensor, said control module being configured for selectively actuating said speed detector, said visual warning module, said imager, and said sensor; and
wherein said control module is positioned for determining a separation between the first vehicle and the second vehicle and a speed of the second vehicle based on signals from said speed detector and said sensor for determining a tailgating event, wherein said control module is positioned for selectively commanding said visual warning module for displaying the notification to the driver of the second vehicle, and wherein said control module is positioned for selectively commanding said imager for capturing the image of the tailgating event;
a third housing defining a third interior space, said speed detector and said visual warning module being coupled to a first side of said third housing;
a second power module coupled to said third housing and positioned in said third interior space;
a second transceiver coupled to said third housing and positioned in said third interior space, said second transceiver being operationally coupled to said second power module, said speed detector and said visual warning module;
a fourth housing defining a fourth interior space, said sensor and said imager being coupled to a first face of said fourth housing;

a third power module coupled to said fourth housing and positioned in said fourth interior space;
a third transceiver coupled to said fourth housing and positioned in said fourth interior space, said third transceiver being operationally coupled to said third power module, said sensor and said imager; and
wherein said second transceiver is positioned in said third housing such that said second transceiver is positioned for receiving commands from said microprocessor via said first transceiver for selectively controlling said second power module, said speed detector, and said visual warning module, wherein said second transceiver is positioned for transmitting the signal from said speed detector to said microprocessor via said first transceiver, wherein said third transceiver is positioned in said fourth housing such that said third transceiver is positioned for receiving commands from said microprocessor via said first transceiver for selectively controlling said third power module, said sensor, and said imager, wherein said third transceiver is positioned for transmitting the signal from said sensor and the image from said imager to said microprocessor via said first transceiver.

10. The assembly of claim 9, further comprising:
said second power module comprising a first battery; and
said third power module comprising a second battery.

11. The assembly of claim 9, further comprising:
a first coupler coupled to said third housing, said first coupler being configured for coupling said third housing to an inner surface of a rear window of the first vehicle; and
a second coupler coupled to said fourth housing, said second coupler being configured for coupling said fourth housing to the inner surface of the rear window of the first vehicle.

12. The assembly of claim 11, further comprising:
said first coupler comprising:
a pair of first arms, each said first arm being coupled to and extending transversely from a top of said third housing proximate to said first side,
a pair of first cups, each said first cup being coupled to a respective said first arm distal from said third housing, and
a pair of first ball joints, each said first ball joint being coupled to and extending between a respective said first arm and an associated said first cup;
said second coupler comprising:
a pair of second arms, each said second arm being coupled to and extending transversely from an upper face of said fourth housing proximate to said first face,
a pair of second cups, each said second cup being coupled to a respective said second arm distal from said fourth housing, and
a pair of second ball joints, each said second ball joint being coupled to and extending between a respective said second arm and an associated said second cup; and
wherein said first cups are positioned on said first arms such that said first cups are configured for depressing against the rear window for suctionally coupling said third housing to the rear window, wherein said second cups are positioned on said second arms such that said second cups are configured for depressing against the rear window for suctionally coupling said fourth housing to the rear window.

13. The assembly of claim 11, further comprising:
a first tube comprising pleated foam rubber such that said first tube is selectively extensible, said first tube being coupled to and extending from said first side of said third housing;
a first gasket coupled to a perimeter of said first tube distal from said third housing;
a first actuator coupled to said third housing and positioned in said third internal space, said first actuator being operationally coupled to said first gasket;
a second tube comprising pleated foam rubber such that said second tube is selectively extensible, said second tube being coupled to and extending from said first face of said fourth housing;
a second gasket coupled to a circumference of said second tube distal from said fourth housing;
a second actuator coupled to said fourth housing and positioned in said fourth interior space, said second actuator being operationally coupled to said second gasket; and
wherein said first actuator is positioned on said third housing such that said first actuator is positioned for selectively extending said first tube such that said first gasket is sealably coupled to the rear window for blocking light from impinging on said speed detector and said visual warning module, wherein said second actuator is positioned on said fourth housing such that said second actuator is positioned for selectively extending said second tube such that said second gasket is sealably coupled to the rear window for blocking light from impinging on said sensor and said imager.

14. The assembly of claim 13, further comprising:
said first actuator comprising:
  a pair of first cylinders, each said first cylinder being rotationally coupled to a respective opposing side face of said third housing such that said first cylinder protrudes through a first orifice positioned in said respective said opposing side face, and
  a pair of first rods, each said first rod being operationally coupled to an associated said first cylinder such that said first rod is selectively extensible from said first side of said third housing, each said first rod being coupled to said first gasket;
said second actuator comprising:
  a pair of second cylinders, each said second cylinder being rotationally coupled to a respective opposing side of said fourth housing such that said second cylinder protrudes through a second orifice positioned in said respective said opposing side, and
  a pair of second rods, each said second rod being operationally coupled to an associated said second cylinder such that said second rod is selectively extensible from said first face of said fourth housing, each said second rod being coupled to said second gasket; and
wherein said first cylinders are positioned on said third housing such that each said first cylinder is positioned for being rotated by a digit of a hand of a user for selectively extending an associated said first rod such that said first gasket is sealably coupled to the rear window for blocking the light from impinging on said speed detector and said visual warning module, wherein said second cylinders are positioned on said fourth housing such that each said second cylinder is positioned for being rotated by the digit of the hand of the user for selectively extending an associated said second rod such that said second gasket is sealably coupled to the rear window for blocking the light from impinging on said sensor and said imager.

15. A tailgating detection and monitoring assembly comprising:
a speed detector configured for coupling to a rear window of a first vehicle, said speed detector being configured for selectively measuring a speed of the first vehicle, said speed detector comprising a doppler radar unit such that the speed of the first vehicle is determined relative to a stationary background;
a sensor configured for coupling to the rear window, said sensor being configured for selectively measuring a distance between the first vehicle and a second vehicle behind the first vehicle, said sensor comprising a laser emitter and a laser receiver;
a visual warning module configured for coupling to the rear window, said visual warning module being configured for selectively displaying a notification to a driver of the second vehicle, said visual warning module comprising a plurality of lights, each said light emitting a respective color such that said plurality of lights is positioned for selectively emitting one of a plurality of colors, said plurality of lights comprising an amber emitter and a red emitter;
an imager configured for coupling to the rear window, said imager being configured for selectively capturing an image of the second vehicle, said imager comprising a video camera;
a control module operationally coupled to said speed detector, said visual warning module, said imager, and said sensor, said control module being configured for selectively actuating said speed detector, said visual warning module, said imager, and said sensor, wherein said control module is positioned for determining a separation between the first vehicle and the second vehicle and a speed of the second vehicle based on signals from said speed detector and said sensor for determining a tailgating event, wherein said control module is positioned for selectively commanding said visual warning module for displaying the notification to the driver of the second vehicle, and wherein said control module is positioned for selectively commanding said imager for capturing the image of the tailgating event, said control module being wirelessly coupled to said speed detector, said visual warning module, said imager, and said sensor, said control module comprising:
  a first housing defining a first interior space,
  a first power module coupled to said first housing and positioned in said first interior space, said first power module comprising a first port and a cable, said first port being coupled to said first housing, said first port being operationally coupled to said microprocessor, said cable having a first plug coupled to a first end, said first plug being complementary to said first port, said cable having a second plug coupled to a second end, said second plug being complementary to a cigarette lighter receptacle of the first vehicle, wherein said first plug and said second plug are positioned on said cable such that said first plug is positioned for inserting into said first port and said second plug is configured for inserting into the cigarette lighter receptacle for powering said control module, a microprocessor coupled to said first housing and positioned in said first interior space, said microprocessor being operationally coupled to said first power module, a data storage module coupled to said first housing and positioned in said first interior space, said data storage module being operationally coupled to said microprocessor, wherein said data storage module is positioned in said first housing such that said data storage module is positioned for storing the image of the tailgating event captured by said imager, and a first transceiver coupled to said first housing and positioned in said first interior space, said first transceiver being operationally coupled to said microprocessor, wherein said first transceiver is positioned in said first housing such that said first transceiver is configured for transmitting the image of the tailgating event to an external device;

a second port coupled to said first housing, said second port being operationally coupled to said microprocessor;

a remote controller operationally coupled to said control module such that said remote controller is positioned for selectively inputting commands into said microprocessor for controlling said speed detector, said visual warning module, said imager, and said sensor, said remote controller comprising:

a second housing defining a second interior space, a cord coupled to and extending from said second housing, a third plug coupled to a terminus of said cord distal from said second housing, said third plug being complementary to said second port, wherein said third plug is positioned on said cord such that said third plug is positioned for inserting into said second port for operationally coupling said remote controller to said control module, and a first button, a second button, a third button, a fourth button, a fifth button, and a sixth button coupled to said second housing, said first button, said second button, said third button, said fourth button, said fifth button, and said sixth button being selectively depressible and operationally coupled to said cord, wherein said first button is configured for depressing for selectively coupling said microprocessor to said first power module, wherein said second button and said third button are configured for depressing for selectively inputting commands into said microprocessor for adjusting algorithms used for selectively controlling said speed detector, said visual warning module, said imager, and said sensor, wherein said fourth button is configured for depressing for selectively instructing said microprocessor for commanding said visual warning module for displaying the notification to the driver of the second vehicle, wherein said fifth button is configured for depressing for selectively instructing said microprocessor for commanding said imager for terminating capturing of the image of the tailgating event, wherein said sixth button is configured for depressing for selectively instructing said microprocessor for commanding said imager for commencing capturing of the image of the tailgating event;

a monitor operationally coupled to said control module, said monitor being configured for selectively presenting to an operator of the first vehicle the speed of the first vehicle, the speed of the second vehicle, the separation between the first vehicle and the second vehicle, and the image of the tailgating event;

a third port coupled to said first housing, said third port being operationally coupled to said microprocessor, said third port being selectively couplable to said monitor for operationally coupling said monitor to said control module, said third port being selectively couplable to the external device for transmitting the image of the tailgating event to the external device from said data storage module;

a fourth port coupled to said first housing, said fourth port being operationally coupled to said microprocessor, said speed detector comprising a global positioning system receiver, said global positioning system receiver being coupled to said fourth port such that the speed of the first vehicle is determined by positional change of the first vehicle;

a third housing defining a third interior space, said speed detector and said visual warning module being coupled to a first side of said third housing;

a second power module coupled to said third housing and positioned in said third interior space, said second power module comprising a first battery;

a second transceiver coupled to said third housing and positioned in said third interior space, said second transceiver being operationally coupled to said second power module, said speed detector and said visual warning module, wherein said second transceiver is positioned in said third housing such that said second transceiver is positioned for receiving commands from said microprocessor via said first transceiver for selectively controlling said second power module, said speed detector, and said visual warning module, wherein said second transceiver is positioned for transmitting the signal from said speed detector to said microprocessor via said first transceiver;

a first coupler coupled to said third housing, said first coupler being configured for coupling said third housing to an inner surface of a rear window of the first vehicle, said first coupler comprising:

a pair of first arms, each said first arm being coupled to and extending transversely from a top of said third housing proximate to said first side, a pair of first cups, each said first cup being coupled to a respective said first arm distal from said third housing, wherein said first cups are positioned on said first arms such that said first cups are configured for depressing against the rear window for suctionally coupling said third housing to the rear window, and a pair of first ball joints, each said first ball joint being coupled to and extending between a respective said first arm and an associated said first cup;

a first tube comprising pleated foam rubber such that said first tube is selectively extensible, said first tube being coupled to and extending from said first side of said third housing;

a first gasket coupled to a perimeter of said first tube distal from said third housing;

a first actuator coupled to said third housing and positioned in said third internal space, said first actuator being operationally coupled to said first gasket, wherein said first actuator is positioned on said third housing such that said first actuator is positioned for selectively extending said first tube such that said first gasket is sealably coupled to the rear window for blocking light from impinging on said speed detector and said visual warning module, said first actuator comprising:
  a pair of first cylinders, each said first cylinder being rotationally coupled to a respective opposing side face of said third housing such that said first cylinder protrudes through a first orifice positioned in said respective said opposing side face, and
  a pair of first rods, each said first rod being operationally coupled to an associated said first cylinder such that said first rod is selectively extensible from said first side of said third housing, each said first rod being coupled to said first gasket, wherein said first cylinders are positioned on said third housing such that each said first cylinder is positioned for being rotated by a digit of a hand of a user for selectively extending an associated said first rod such that said first gasket is sealably coupled to the rear window for blocking the light from impinging on said speed detector and said visual warning module;
a fourth housing defining a fourth interior space, said sensor and said imager being coupled to a first face of said fourth housing;
a third power module coupled to said fourth housing and positioned in said fourth interior space, said third power module comprising a second battery;
a third transceiver coupled to said fourth housing and positioned in said fourth interior space, said third transceiver being operationally coupled to said third power module, said sensor and said imager, wherein said third transceiver is positioned in said fourth housing such that said third transceiver is positioned for receiving commands from said microprocessor via said first transceiver for selectively controlling said third power module, said sensor, and said imager, wherein said third transceiver is positioned for transmitting the signal from said sensor and the image from said imager to said microprocessor via said first transceiver;
a second coupler coupled to said fourth housing, said second coupler being configured for coupling said fourth housing to the inner surface of the rear window of the first vehicle, said second coupler comprising:
  a pair of second arms, each said second arm being coupled to and extending transversely from an upper face of said fourth housing proximate to said first face, and
  a pair of second cups, each said second cup being coupled to a respective said second arm distal from said fourth housing, wherein said second cups are positioned on said second arms such that said second cups are configured for depressing against the rear window for suctionally coupling said fourth housing to the rear window;
  a pair of second ball joints, each said second ball joint being coupled to and extending between a respective said second arm and an associated said second cup;
a second tube comprising pleated foam rubber such that said second tube is selectively extensible, said second tube being coupled to and extending from said first face of said fourth housing;
a second gasket coupled to a circumference of said second tube distal from said fourth housing;
a second actuator coupled to said fourth housing and positioned in said fourth interior space, said second actuator being operationally coupled to said second gasket, wherein said second actuator is positioned on said fourth housing such that said second actuator is positioned for selectively extending said second tube such that said second gasket is sealably coupled to the rear window for blocking light from impinging on said sensor and said imager said second actuator comprising:
  a pair of second cylinders, each said second cylinder being rotationally coupled to a respective opposing side of said fourth housing such that said second cylinder protrudes through a second orifice positioned in said respective said opposing side, and
  a pair of second rods, each said second rod being operationally coupled to an associated said second cylinder such that said second rod is selectively extensible from said first face of said fourth housing, each said second rod being coupled to said second gasket, wherein said second cylinders are positioned on said fourth housing such that each said second cylinder is positioned for being rotated by the digit of the hand of the user for selectively extending an associated said second rod such that said second gasket is sealably coupled to the rear window for blocking the light from impinging on said sensor and said imager; and
wherein said first cups are positioned on said first arms such that said first cups are configured for depressing against the rear window for suctionally coupling said third housing to the rear window, wherein said second cups are positioned on said second arms such that said second cups are configured for depressing against the rear window for suctionally coupling said fourth housing to the rear window, wherein said control module is positioned for determining the separation between the first vehicle and the second vehicle and the speed of the second vehicle based on the signals from said speed detector and said sensor for determining the tailgating event, wherein said control module is positioned for selectively commanding said visual warning module for displaying the notification to the driver of the second vehicle, and wherein said control module is positioned for selectively commanding said imager for capturing the image of the tailgating event.

* * * * *